United States Patent
Lock et al.

(10) Patent No.: US 10,309,297 B2
(45) Date of Patent: Jun. 4, 2019

(54) METHOD AND SYSTEMS FOR A TURBOCHARGER

(71) Applicant: General Electric Company, Schenectady, NY (US)

(72) Inventors: Vincent Waikeet Lock, Erie, PA (US); James Robert Mischler, Erie, PA (US); Maryam Abdollahi, Erie, PA (US); Joseph Audu Ishaku, Erie, PA (US); Richard James Scott, North East, PA (US); Christian Roland Tollefson, Erie, PA (US)

(73) Assignee: GE Global Sourcing LLC, Norwalk, CT (US)

(*) Notice: Subject to any disclaimer, the term of this patent is extended or adjusted under 35 U.S.C. 154(b) by 96 days.

(21) Appl. No.: 15/190,496

(22) Filed: Jun. 23, 2016

(65) Prior Publication Data
US 2017/0370280 A1    Dec. 28, 2017

(51) Int. Cl.
| *F02B 37/16* | (2006.01) |
| *F02B 37/00* | (2006.01) |
| *F02B 37/007* | (2006.01) |
| *F02B 37/18* | (2006.01) |
| *G01L 19/00* | (2006.01) |
| *F02B 37/12* | (2006.01) |

(52) U.S. Cl.
CPC ............ *F02B 37/16* (2013.01); *F02B 37/004* (2013.01); *F02B 37/007* (2013.01); *F02B 37/18* (2013.01); *G01L 19/0092* (2013.01); *F02B 2037/125* (2013.01); *Y02T 10/144* (2013.01)

(58) Field of Classification Search
CPC ...... F02B 37/16; F02B 37/004; F02B 37/007; F02B 37/18; F02B 2037/125; G01L 19/0092
USPC .................. 60/605.1, 611, 612, 602; 123/562
See application file for complete search history.

(56) References Cited

U.S. PATENT DOCUMENTS

| 4,265,589 A | * | 5/1981 | Watson | ................ | F01D 17/143 415/118 |
| 4,363,596 A | * | 12/1982 | Watson | ................ | F01D 17/143 415/1 |
| 4,545,198 A | * | 10/1985 | Yoshida | ............. | F04D 27/0261 60/39.25 |
| 4,594,050 A | * | 6/1986 | Gaston | ................ | F04D 27/001 415/1 |
| 4,594,051 A | * | 6/1986 | Gaston | ................ | F04D 27/001 701/100 |
| 4,805,574 A | * | 2/1989 | Sakamoto | ............ | F02P 5/1528 123/406.55 |

(Continued)

*Primary Examiner* — Thai Ba Trieu
(74) *Attorney, Agent, or Firm* — McCoy Russell LLP

(57) ABSTRACT

Various methods and systems are provided for a detecting surge of a turbocharger in an engine system. In one example, system includes a turbocharger including a compressor coupled to a turbine and a controller and sensor system configured to detect a surge event of the turbocharger based on at least one of a rate of change of a pressure measured by sensors downstream of the compressor and a measured rate of change of turbine speed, store operational data associated with the surge event in memory of the controller, and determine a performance of the turbocharger based at least in part on one or more of a cumulative number of detected surge events, a magnitude of detected surge events, or associated operational data.

17 Claims, 7 Drawing Sheets

(56) References Cited

U.S. PATENT DOCUMENTS

| | | | | |
|---|---|---|---|---|
| 5,306,116 | A * | 4/1994 | Gunn | F04D 27/02 |
| | | | | 701/100 |
| 5,698,780 | A * | 12/1997 | Mizutani | F02D 41/222 |
| | | | | 73/114.33 |
| 5,971,712 | A * | 10/1999 | Kann | F04D 27/0207 |
| | | | | 417/18 |
| 6,357,234 | B1 * | 3/2002 | Gladden | F02B 37/007 |
| | | | | 60/611 |
| 6,408,624 | B1 | 6/2002 | Books et al. | |
| 6,945,047 | B2 | 9/2005 | Shea et al. | |
| 8,152,496 | B2 * | 4/2012 | White | F04D 27/0215 |
| | | | | 417/282 |
| 8,307,645 | B2 | 11/2012 | Mischler et al. | |
| 9,194,319 | B2 * | 11/2015 | Mischler | F02D 41/0007 |
| 9,790,849 | B2 * | 10/2017 | Xiao | F02D 41/0007 |
| 2004/0216457 | A1 * | 11/2004 | Shea | F02D 41/0007 |
| | | | | 60/608 |
| 2010/0204899 | A1 * | 8/2010 | Serres | F02D 41/0007 |
| | | | | 701/103 |
| 2014/0214304 | A1 | 7/2014 | Mischler et al. | |
| 2015/0096296 | A1 * | 4/2015 | Banker | F02D 23/02 |
| | | | | 60/611 |
| 2017/0058792 | A1 * | 3/2017 | Bartsch | F02B 37/16 |

\* cited by examiner

METHOD AND SYSTEMS FOR A TURBOCHARGER

BACKGROUND

Technical Field

Embodiments of the subject matter disclosed herein relate to a turbocharged engine system.

Discussion of Art

Engines may utilize one or more turbochargers to provide increased power. Turbochargers function by compressing intake air in a compressor driven by a turbine operated by exhaust gas flow. During certain conditions, turbochargers may experience surge. Surge occurs when the compressor is no longer able to pump air into the charged air piping (e.g., intake manifold) due to excessive pressure in the charged air piping. When this happens, it causes a transient response where the air flows backwards through the compressor wheel. This causes an unloading of the compressor wheel which results in a speed increase of the turbocharger turbine. Surging can be common during rapid unloading events of the engine. Repeated surging events can cause degradation of the turbocharger, including blade segments breaking from the compressor wheel.

BRIEF DESCRIPTION

In one embodiment, a system includes a turbocharger with a compressor coupled to a turbine, and a controller and sensor system. The controller and sensor system is configured to detect a surge event of the turbocharger based on at least one of a rate of change of a pressure measured by sensors downstream of the compressor and/or a measured rate of change of turbine speed, store operational data associated with the surge event in memory of the controller, and determine a performance of the turbocharger based at least in part on one or more of a cumulative number of detected surge events, a magnitude of detected surge events, and/or associated operational data.

DETAILED DESCRIPTION

The following description relates to embodiments of a turbocharger system for an engine. An engine system, such as the engine systems shown by FIGS. 1-3, may include a turbocharger system having one or more turbochargers. Turbochargers may undergo surge, wherein compressed intake air flows backward through the compressor. Engine systems may be configured to operate near a surge margin, due to a region of peak compressor efficiency being located near the surge margin. The surge margin may be defined as a margin of engine operation having a given trajectory of compressor air flow rates and compressor pressure ratios, on side of which surge may occur. Thus, engine systems may adjust various operating parameters, such as a wastegate or compressor bypass valve position, to increase compressor air flow and/or lower the compressor pressure ratio when operating near the surge margin, in order to avoid surge. It is noted that actual detection of surge events particularly during transient engine unloading events may be difficult to detect as the engine parameters that are indicative of surge (e.g., intake pressure) are also changing due to the transient event.

Figure 4:
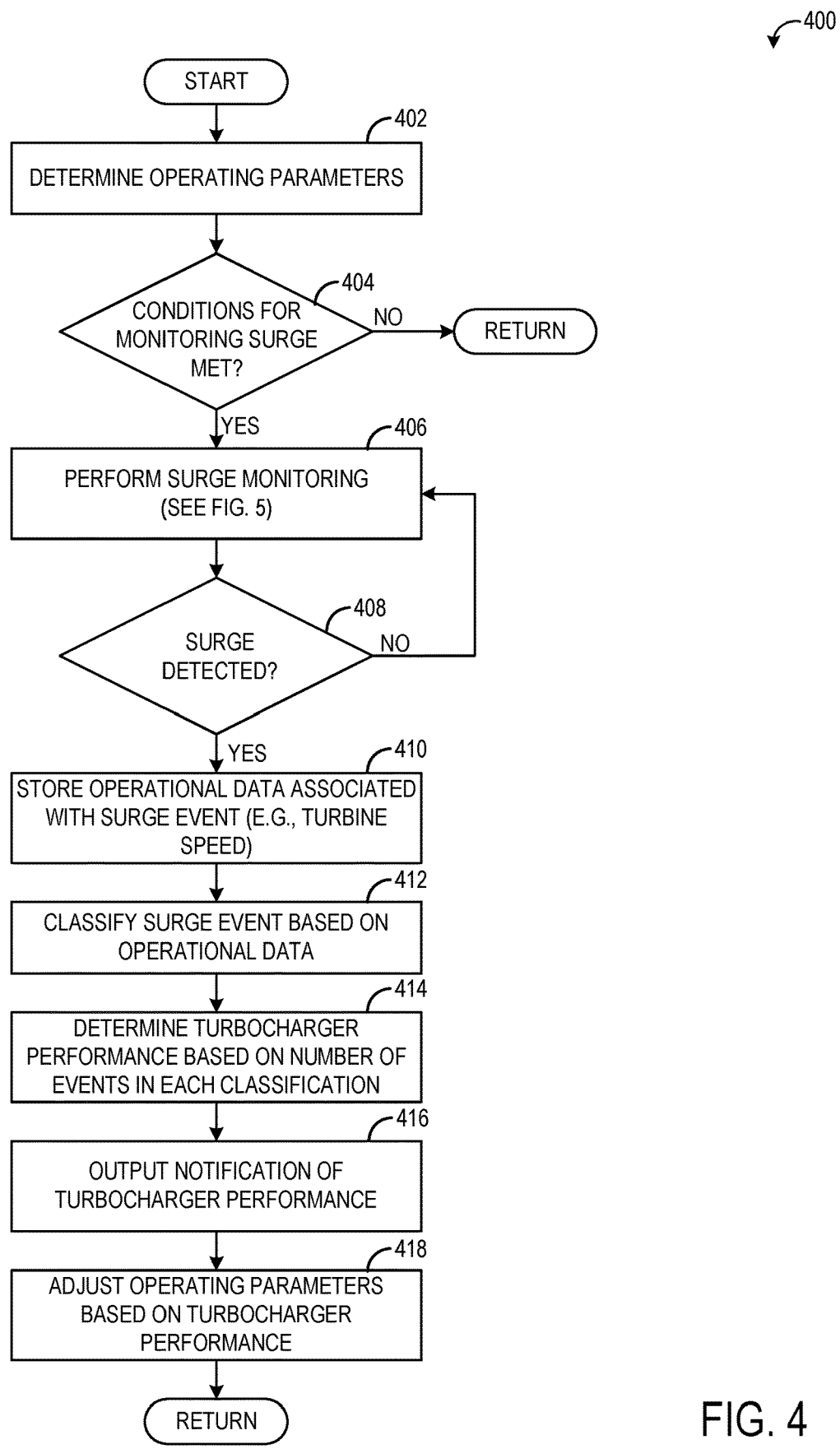
FIG. 4 shows a flow chart illustrating a method for operating an engine having a turbocharger system according to an embodiment of the invention.
Figure 5:
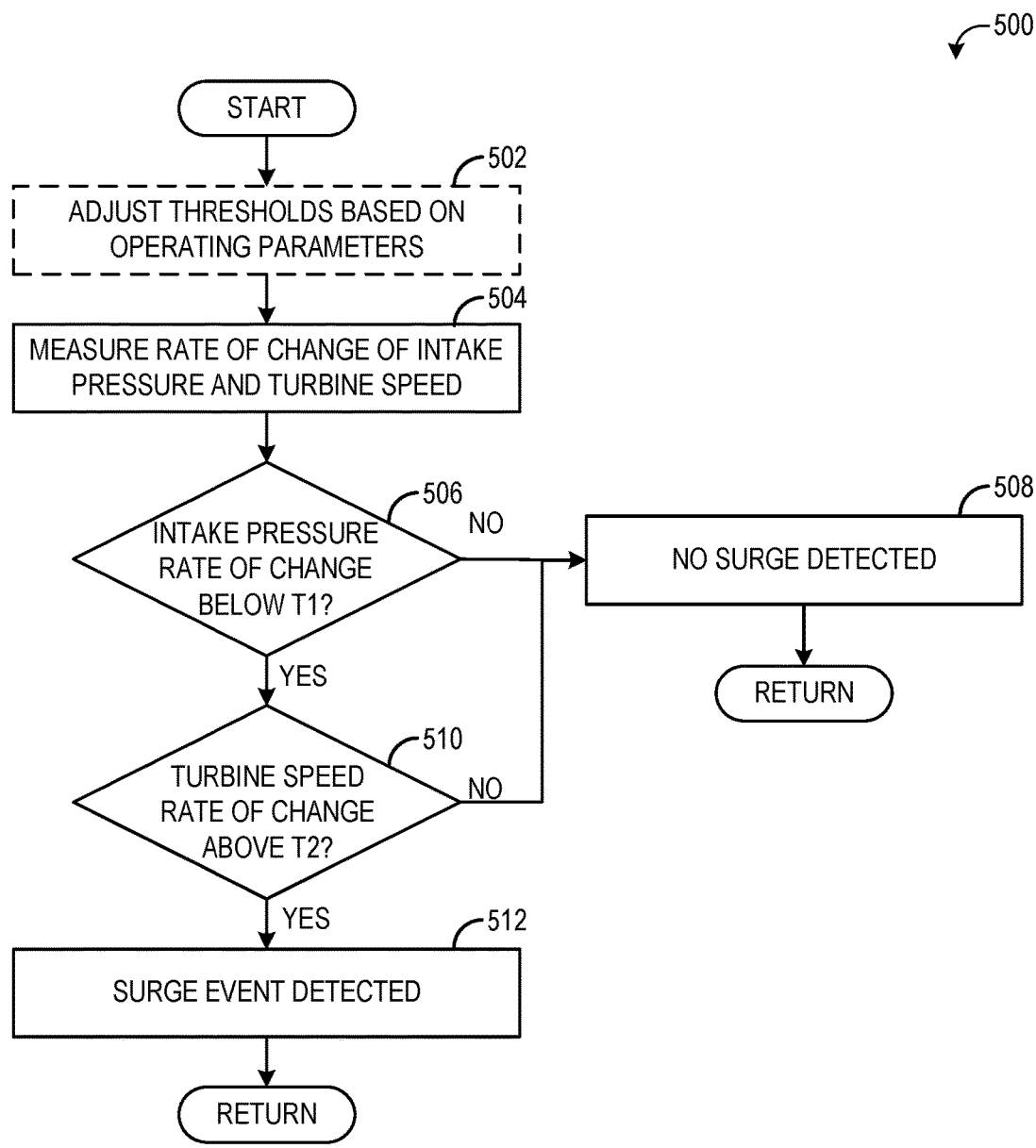
FIG. 5 shows a flow chart illustrating a method for monitoring for turbocharger surge according to an embodiment of the invention.

Thus, as illustrated by the methods of FIGS. 4 and 5 and as described in more detail below, transient surge events may be detected by monitoring a rate of change of sensed intake pressure downstream of a compressor as well as a rate of change of turbine speed. When both the rate of change of the intake pressure and the rate of change of the turbine speed meet conditions relative to respective thresholds, a surge event may be identified, as shown by the graphs of operating parameters of FIGS. 6A, 6B, and 7. Each time a surge event is detected, operational data at the time of the surge event, such as turbine speed and a duration of the surge event, may be collected and used to classify a magnitude of the surge event. The performance of the turbocharger, such as an estimated age of the compressor wheel, may be determined from the classified surge events, and a notification of the performance of the turbocharger may be output to an operator to trigger preventative maintenance, used to adjust engine and/or turbocharger operation, or other suitable action.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
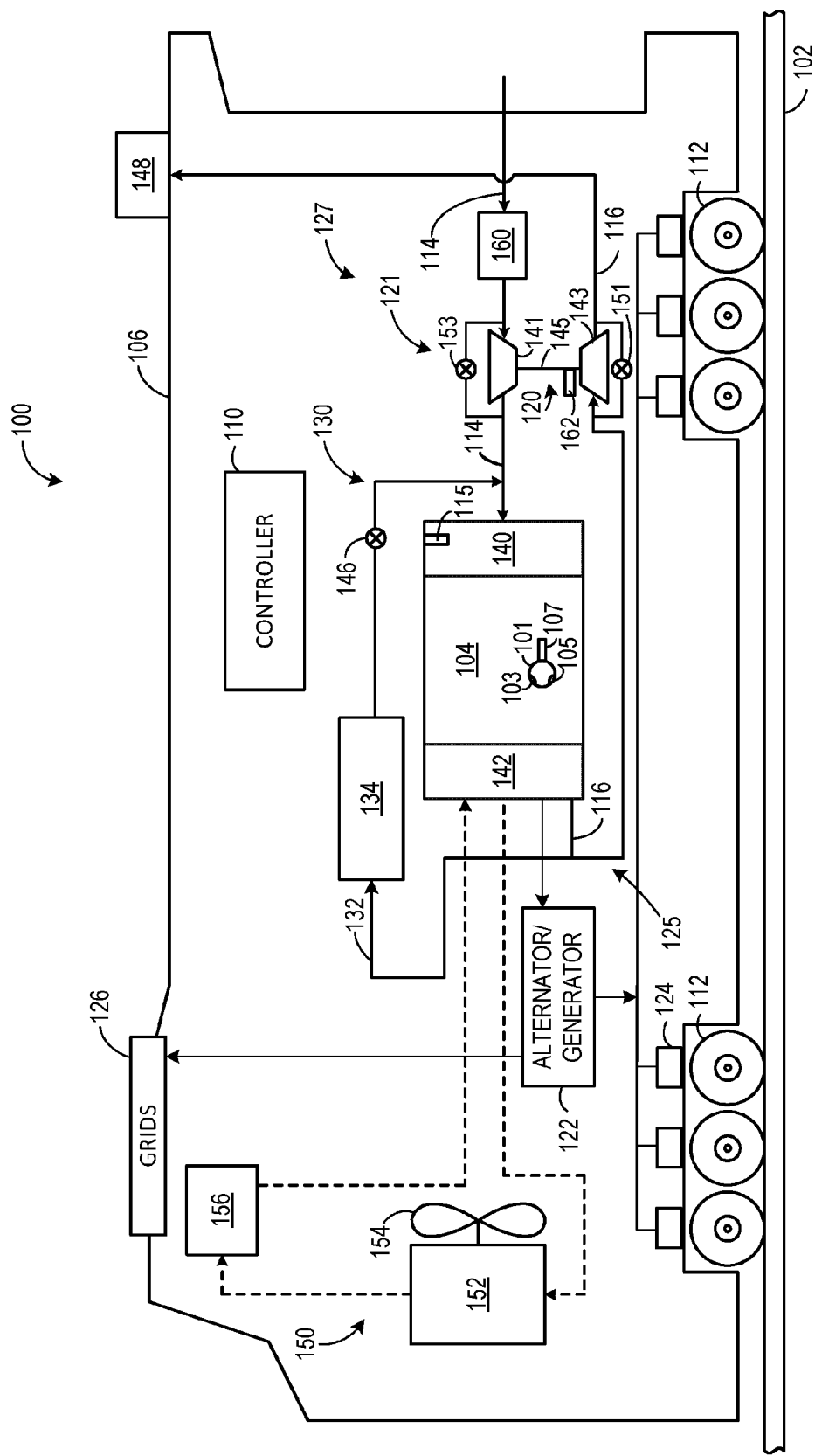
FIG. 1 shows a schematic diagram for an engine system including a turbocharger system according to an embodiment of the invention.

Before further discussion of the approach for monitoring turbocharger performance, an embodiment of the engine system is presented. Specifically, FIG. 1 shows a schematic diagram of an embodiment of an engine system 100, herein depicted as a rail vehicle 106 (e.g., locomotive), configured to run on a rail 102 via a plurality of wheels 112. As depicted, the rail vehicle includes an engine 104. The engine includes a plurality of cylinders, such as cylinder 101. While FIG. 1 shows one cylinder, the engine system may include additional cylinders that are not shown. Each of the cylinders includes at least one intake valve (such as intake valve 103), exhaust valve (such as exhaust valve 105), and fuel injector (such as fuel injector 107). Each intake valve, exhaust valve, and fuel injector may include an actuator that is actuatable via a signal from a controller 110 of the engine. In other non-limiting embodiments, the engine may be a stationary engine, such as in a power-plant application, or an engine in a marine vessel or other off-highway vehicle propulsion system as noted above. Further, in some embodiments, the plurality of cylinders may include a first group of donor cylinders and a second group of non-donor cylinders, where the donor cylinders supply exhaust to an exhaust gas recirculation (EGR) passage routing exhaust back to the intake of the engine, as explained further below.

An intake manifold 140 of an intake system 127 of the engine receives intake air for combustion from an intake passage 114. The intake passage is fluidly and directly connected to the intake manifold, and the intake manifold is fluidly coupled to each of the cylinders. The intake passage receives ambient air from an air filter 160 that filters air from outside of the rail vehicle. The intake passage flows the filtered air into the intake manifold where it is delivered to the cylinders. Exhaust gas resulting from combustion in the engine is supplied to an exhaust passage 116 directly and fluidly coupled to an exhaust manifold 142 of an exhaust system 125. Exhaust gas flows from the exhaust manifold, through the exhaust passage, and out of an exhaust stack 148 of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

The engine system includes a turbocharger system 121. The turbocharger system includes a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor 141 which is at least partially driven by a turbine 143 and coupled to the turbine via a shaft 145. While in this case a single turbocharger is included, the system may include multiple turbine and/or compressor stages, as will be described below with respect to FIGS. 2 and 3.

The turbine and/or compressor of the turbocharger may include a bypass passage coupled around the respective turbine or compressor. Each bypass passage may be controlled by a corresponding valve. As shown, a turbine bypass valve 151, also referred to as a wastegate, may control flow of exhaust gas around the turbine. The turbine bypass valve may be adjusted to control boost pressure, EGR flow rate, turbocharger speed, and/or other parameters. Further, a compressor bypass valve 153 may control flow of intake air around the compressor. The compressor bypass valve may be adjusted to recirculate compressed intake air back to upstream of the compressor, thus increasing intake air flow rate though the compressor to avoid surge.

Additionally or alternatively, in some embodiments, a supercharger may be present to compress the intake air via a compressor driven by a motor or the engine, for example. Further, in some embodiments, a charge air cooler (not shown) such as a water-based intercooler may be arranged between the compressor of the turbocharger or supercharger and intake manifold of the engine, and may be fluidly coupled to both of the turbocharger or supercharger and the intake manifold. The charge air cooler may cool the compressed air to further increase the density of the charge air.

The engine system may further include an exhaust gas recirculation (EGR) system 130 coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system). As depicted in FIG. 1, the EGR system includes an EGR passage 132 and an EGR cooler 134 to reduce the temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., NOx).

In some embodiments, the EGR system may further include an EGR valve 146 for controlling an amount of exhaust gas that is recirculated from the exhaust passage of the engine to the intake passage of the engine. The EGR valve may be an on/off valve controlled by the controller, or it may control a variable amount of EGR. For example, the EGR valve may be opened to the exhaust passage and intake passage, closed to the exhaust passage and intake passage, or moved into a plurality of positions between fully opened or fully closed to the exhaust passage and intake passage. As shown in the non-limiting example embodiment of FIG. 1, the EGR system is a high-pressure EGR system (which routes exhaust gas from upstream of the turbine to downstream of the compressor). In other embodiments, the engine system may additionally include a low-pressure EGR system, routing EGR from downstream of the turbine to upstream of the compressor.

As depicted in FIG. 1, the engine system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller.

Coolant which is cooled by the radiator may enter a tank (not shown). The coolant may then be pumped by a water, or coolant, pump 156 back to the engine or to another component of the engine system, such as the EGR cooler and/or charge air cooler.

The rail vehicle further includes the controller (e.g., engine controller) to control various components related to the rail vehicle. As an example, various components of the engine system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure from a manifold absolute pressure (MAP) sensor 115, boost pressure, exhaust pressure, ambient pressure, ambient temperature, exhaust temperature, particulate filter temperature, particulate filter back pressure, engine coolant pressure, gas temperature in the EGR cooler, etc. The controller may also receive a signal of a speed of the turbine of the turbocharger from a turbine speed sensor 162. Additional sensors, such as coolant temperature sensors, may be positioned in the cooling system. Correspondingly, the controller may control the engine and/or the rail vehicle by sending commands to various components such as the traction motors, the alternator/generator, fuel injectors, valves, or the like. For example, the controller may control the operation of a restrictive element (e.g., such as a valve) in the engine cooling system. Other actuators may be coupled to various locations in the rail vehicle.

Figure 2:
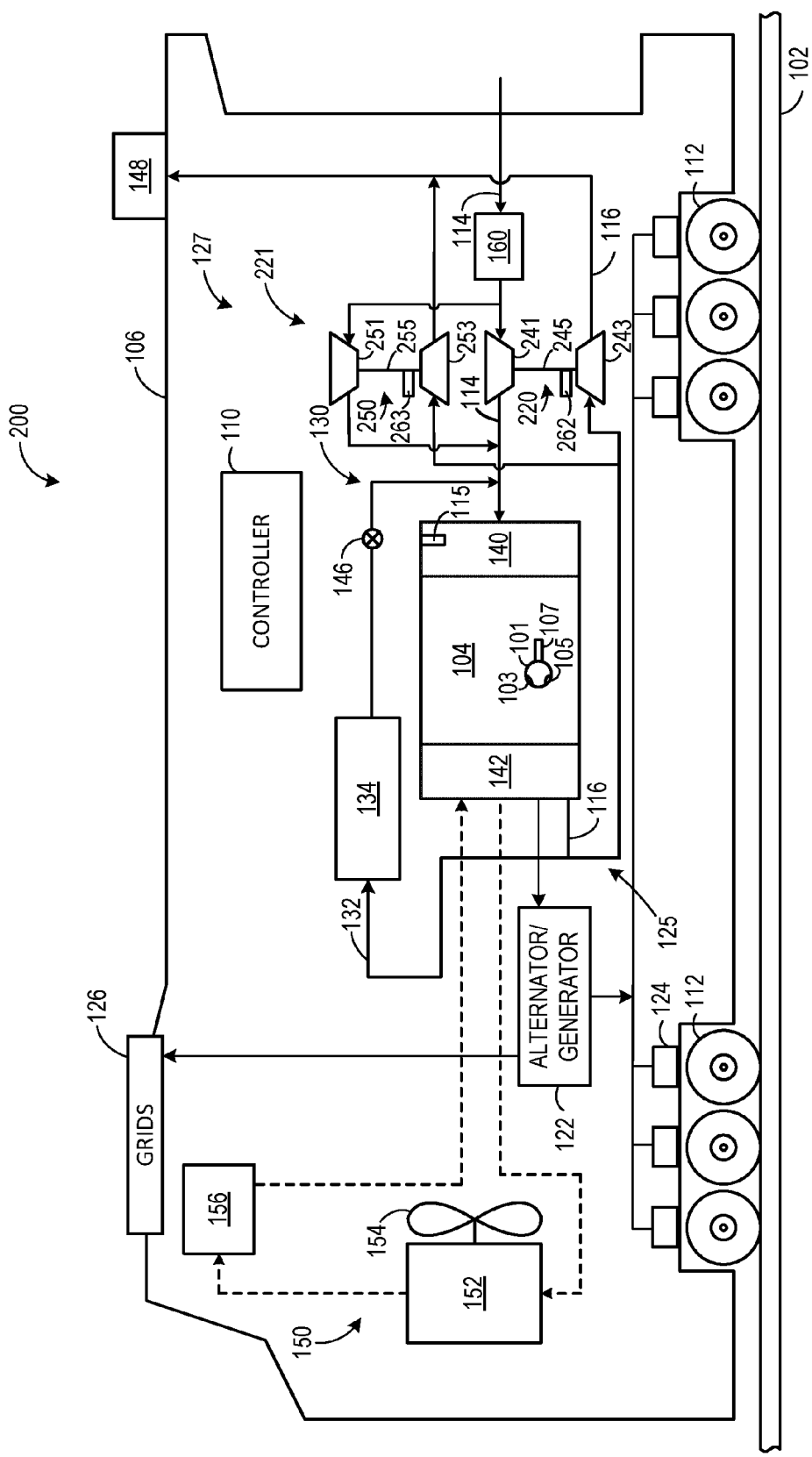
FIG. 2 shows a schematic diagram for an engine system including a turbocharger system according to another embodiment of the invention.

FIG. 2 depicts another embodiment of an engine system 200. The engine system of FIG. 2 may be similar to the engine system of FIG. 1, but may have a different turbocharger system configuration. As such, components in FIG. 2 that correspond to components in FIG. 1 are given like reference numbers and additional description thereof is omitted.

The engine system of FIG. 2 has a turbocharger system 221. The turbocharger system includes a first turbocharger 220 that is arranged between the intake passage and the exhaust passage. The first turbocharger increases air charge of ambient air drawn into the intake passage in order to provide greater charge density during combustion to increase power output and/or engine-operating efficiency. The first turbocharger may include a first compressor 241 which is at least partially driven by a first turbine 243 and coupled to the turbine via a first shaft 245. A speed of the first turbocharger may be measured by a first turbine speed sensor 262.

The turbocharger system of FIG. 2 includes a second turbocharger 250. The second turbocharger may include a second compressor 251 which is at least partially driven by a second turbine 253 and coupled to the turbine via a second shaft 255. A speed of the second turbocharger may be measured by a second turbine speed sensor 263.

The first turbocharger and the second turbocharger may be arranged in parallel. As such, the intake passage may split after the air filter, delivering intake air to the first compressor via a first branch of the intake passage and delivering intake air to the second compressor via a second branch of the intake passage. Compressed air from the first compressor and from the second compressor is combined upstream of the high-pressure EGR outlet and fed to the engine. Likewise, the exhaust passage may split downstream of the high-pressure EGR take-off, delivering exhaust gas to the first turbine via a first branch of the exhaust passage and delivering exhaust gas to the second turbine via a second branch of the exhaust passage. Exhaust gas passing through the first turbine and exhaust gas passing through the second turbine combine downstream of the turbochargers and is delivered to various downstream devices (e.g., aftertreatment devices, muffler) before exiting via the exhaust stack.

In some examples, one or more of the turbines and/or compressors may include a bypass passage coupled around the respective turbine or compressor. Each bypass passage may be controlled by a turbine bypass valve or compressor bypass valve, as explained above with respect to FIG. 1.

Figure 3:
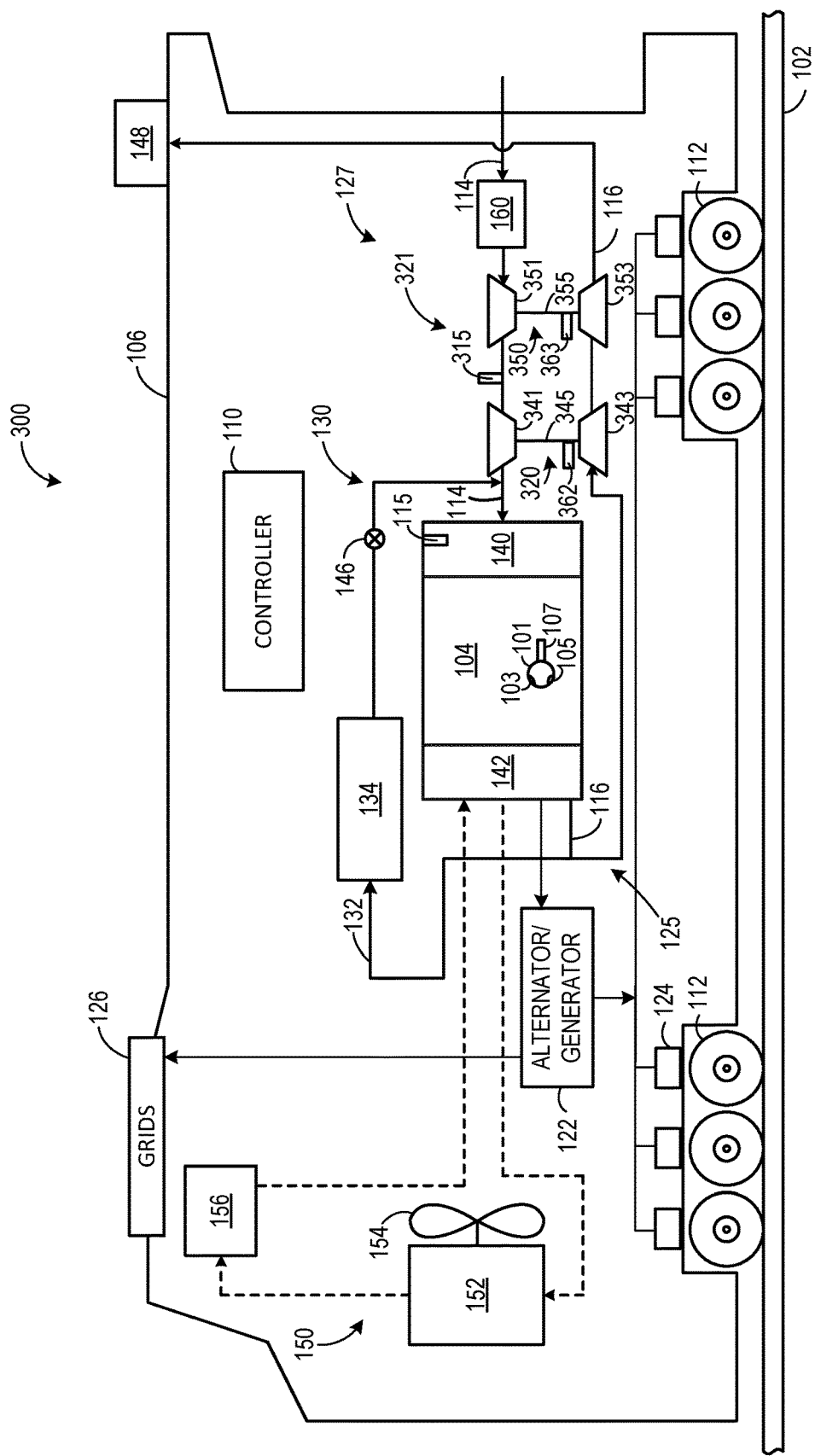
FIG. 3 shows a schematic diagram for an engine system including a turbocharger system according to another embodiment of the invention.

FIG. 3 depicts another embodiment of an engine system 300. The engine system of FIG. 3 may be similar to the engine system of FIG. 1, but may have a different turbocharger system configuration. As such, components in FIG. 3 that correspond to components in FIG. 1 are given like reference numbers and additional description thereof is omitted.

The engine system of FIG. 3 has a turbocharger system 321. The turbocharger system includes a first turbocharger 320 that is arranged between the intake passage and the exhaust passage. The first turbocharger increases air charge of ambient air drawn into the intake passage in order to provide greater charge density during combustion to increase power output and/or engine-operating efficiency. The first turbocharger may include a first compressor 341 which is at least partially driven by a first turbine 343 and coupled to the turbine via a first shaft 345. A speed of the first turbocharger may be measured by a first turbine speed sensor 362.

The turbocharger system of FIG. 3 includes a second turbocharger 350. The second turbocharger may include a second compressor 351 which is at least partially driven by a second turbine 353 and coupled to the turbine via a second shaft 355. A speed of the second turbocharger may be measured by a second turbine speed sensor 363.

The first turbocharger and the second turbocharger may be arranged in series. As such, the second compressor may be arranged in the intake passage upstream of the first compressor. Intake air is first compressed by the second compressor and is then fed to the first compressor, where the intake air undergoes further compression before being fed to the engine. Owing to the higher pressure intake air entering the first compressor, the first compressor may be referred to as a high-pressure compressor while the second compressor may be referred to a low-pressure compressor. The second turbine may be arranged in the exhaust passage downstream of the first turbine. Exhaust gas is first expanded over the first turbine and then is fed to the second turbine, where the exhaust gas further expands and is then delivered to various downstream devices (e.g., aftertreatment devices, muffler) before exiting via the exhaust stack. Owing to the higher pressure exhaust gas entering the first turbine, the first turbine may be referred to as a high-pressure turbine while the second turbine may be referred to a low-pressure turbine. In some examples, one or more of the turbines and/or compressors may include a bypass passage coupled around the respective turbine or compressor. Each bypass passage may be controlled by a turbine bypass valve or compressor bypass valve, as explained above with respect to FIG. 1.

Any of the turbochargers described above with respect to FIGS. 1-3 may undergo surge, where intake pressure downstream of a compressor increases to a point where the compressor is unable to pump additional air, thus causing reversal of the air flow back through the compressor. Surge may be likely to happen during certain conditions, including transient changes in engine load. For example, when engine load decreases relatively rapidly, turbine speed may decrease due to decreasing exhaust flow, yet a reduction in intake manifold pressure may lag behind the decrease in turbine speed. As such, the compressor may experience surge, leading to a rapid drop in intake pressure as the intake air flows backward through the compressor and also leading to an increase in turbine speed.

Compressor surge may be detected or predicated based on compressor air flow and a pressure ratio of intake air upstream and downstream of the compressor. For example, the controller may store a compressor map plotting compressor pressure ratio as a function of compressor air flow for a variety of turbocharger speeds, and if turbocharger operation nears a surge margin of the map, a compressor bypass valve, turbine wastegate, or other parameter may be adjusted to increase compressor air flow, decrease intake manifold pressure, or adjust another suitable parameter to avoid surge.

It may be desirable to also detect surge in real-time as the surge event is occurring. While real-time surge detection may not help mitigate the surge event (due to the relatively short duration of most surge events), detection of surge events as they occur may help determine turbocharger performance, such as estimating the lifespan of the turbocharger, thus triggering proactive maintenance of the turbocharger before degradation occurs. However, the engine and turbocharger operating parameters that are indicative of surge, such as intake manifold pressure, may obscure detection of surge during transient events. For example, during a decrease in engine load, intake manifold pressure may already be dropping, so detection of surge based on a drop in intake manifold pressure may be difficult.

Thus, to detect in surge in real time, the rate of change of both the intake pressure and the turbine speed may be monitored. If the intake pressure rate of change is less than a first threshold rate of change and if the turbine speed rate of change is greater than a second threshold rate of change, surge may be identified. Operational data, such as the turbine speed at the time of surge, may be collected and used to classify the surge event. For example, the surge event may be placed into one of three buckets that are classified by turbine speed. Each bucket may have an amount of turbocharger strain associated with it, and the cumulative number of surge events in each bucket may be used to estimate an amount of strain placed on the turbocharger over its lifetime, in order to estimate an expected lifespan of the turbocharger.

FIG. 4 is flow chart illustrating a method 400 for operating an engine system. The engine system may be engine system 100, engine system 200, or engine system 300 of FIGS. 1-3, respectively. Method 400 may be carried out according to non-transitory instructions stored in memory of a controller, such as controller 110 of FIGS. 1-3, in combination of one or more sensors, such as MAP sensor 115, turbine speed sensors 162, 262, and/or 236, and interstage pressure sensor 315, in order to detect turbocharger surge in real time and determine a performance of one or more turbochargers.

At 402, method 400 includes determining operating parameters. The determined operating parameters include, but are not limited to, engine speed, engine load, turbocharger speed, intake manifold pressure, engine system valve position (e.g., EGR valve position, wastegate or compressor bypass valve position), and ambient conditions (e.g., ambient pressure and temperature, geographic location). At 404, method 400 determines if conditions for monitoring surge are met. In some examples, surge may be monitored during all engine operating conditions. However, in other examples, surge may be monitored only during certain conditions, such as when engine load is above a threshold load, turbine speed is above a threshold speed, or charged air is above a threshold pressure, other conditions. In one example, surge may be monitored according to the routine described below only during transient conditions (e.g., during a change in engine load greater than a threshold over a specified time duration), while surge may be monitored according to a different routine during steady state conditions (e.g., when engine speed and/or load are not changing by the threshold amount over the specified time duration). Further still, as explained in more detail below, the surge monitoring routine may be adjusted based on operating conditions in some examples. For example, various thresholds for indicating surge may be tuned to the specific engine, turbocharger configuration, charged air system, or other hardware configurations.

If the conditions for monitoring surge are not met, method 400 returns and does not carry out the surge monitoring of 406 or any of blocks 410, 412, 414, 416 and 418. If the conditions for monitoring surge are met, method 400 proceeds to 406 to perform surge monitoring, according to the routine explained in more detail below with respect to FIG. 5. Briefly, both intake pressure and turbine speed are assessed and if both the intake pressure and turbine speed meet respective conditions relative to respective thresholds, surge is indicated. At 408, method 400 determines if surge is indicated. If not, method 400 continues performing the surge monitoring.

If surge is indicated, method 400 proceeds to 410 to store operational data associated with the surge event in memory of the controller. Additionally or alternatively, the operational data may be sent to a remote computing device. The operational data may include the detection of the surge event itself and may include a turbine speed associated with the surge event. The turbine speed may be a turbine speed of the turbocharger undergoing surge, and may be the turbine speed prior to detection of surge, after detection of surge, the peak turbine speed during surge, and/or an average turbine speed during the surge. Additional operational data that may be stored includes a duration of the surge, a magnitude of the surge (e.g., the magnitude of the rate of change of the intake pressure and a magnitude of the rate of change of the turbine speed), engine conditions during the surge (e.g., engine speed, engine load), and so forth.

At 412, method 400 includes classifying the surge event based on the operational data. In one example, the surge event may be classified into one of a plurality of turbine speed buckets. For example, each turbine speed bucket may have an associated turbine speed (e.g., a first bucket may include turbine speeds of 45,000-50,000 RPM, a second bucket may include turbine speeds of 40,000-45,000 RPM, and a third bucket may include turbine speeds of 35,000-40,000 RPM) and thus a surge event may be "placed" into a bucket based on the turbine speed. However, other classifications are possible, such as classification based on turbine speed and duration of the surge.

At 414, method 400 includes determining a performance of the turbocharger based on a number of events in each classification or bucket. For example, each bucket may have an associated amount of turbocharger strain. In one example, the first bucket described above may have a higher amount of associated strain than the third bucket. Thus, as the number of surge events classified into the first bucket increases, the amount of strain that has been placed on the turbocharger also increases. Each bucket may have a respective threshold number of events, such as 20 events for the first bucket, 100 events for the second bucket, and 200 events for the third bucket. A lifespan of the turbocharger may be determined based on the cumulative number of events in each bucket. Further, if any of the buckets reaches its respective threshold, a change in performance (e.g., indicative of possible future degradation) may be indicated. In other examples, an average or a weighted average of the cumulative number of events across all buckets may be calculated, and the performance of the turbocharger may be determined based on the average or weighted average.

At 416, method 400 includes outputting a notification of the turbocharger performance, for example as an element displayed on a display device to an operator. Further, a diagnostic code may be set to assist in future maintenance. At 418, method 400 optionally includes adjusting one or more operating parameters based on the turbocharger performance. This may include one or more of adjusting a position of a wastegate or compressor bypass valve, adjusting fuel injection parameters (e.g., timing or amount), derating the engine, or shutting the engine down, depending on the severity of the turbocharger performance. The adjustments made to one or more of the operating parameter(s), as discussed above, are made in order to reduce additional strain placed on the turbocharger. Further, in some examples, the number and classification of surge events may indicate that a change in performance or position of a compressor bypass valve or a wastegate is occurring. For example, if surge events occur even after a compressor bypass valve is adjusted to move compressor operation away from the surge margin, it may indicate that the compressor bypass valve is not reaching or maintaining a commanded position. As such, the controller may adjust one or more signals that control the compressor bypass valve (e.g., to provide either more or less current than previously indicated in order to reach a certain position). Likewise, other operating parameters may be adjusted to mitigate future surge(s), in lieu of the compressor bypass valve. Method 400 then returns.

FIG. 5 is a flow chart illustrating a method 500 for monitoring turbocharger surge. Method 500 may be carried out according to instructions stored in memory of a controller of an engine system, as described above with respect to FIG. 4, and may be performed as part of method 400. Method 500 optionally includes, at 502, adjusting one or more surge thresholds based on operating conditions. As will be described in more detail below, the monitoring of surge includes comparing intake pressure and turbine speed rates of change to respective thresholds. In some examples, one or both of the thresholds may be adjusted based on operating parameters to increase or decrease the sensitivity of the surge detection. For example, during transient conditions (where engine speed and/or load are changing by a threshold amount), thresholds of greater magnitude may be used than during steady state conditions, in order to avoid false positive surge indications during transient conditions while maintaining sensitivity of the detection during steady state conditions. In other examples, the threshold(s) may be adjusted during tunneling conditions (when the vehicle in which the engine is installed is operating in a tunnel where fresh intake air concentration may become limited), during low ambient pressure conditions (e.g., when operating at high altitude), during condensate purging (from a charge air cooler, for example), during valve diagnostic tests (where one or more valves, such as EGR valves, may be held in various commanded positions), and so forth. In this way, the sensitivity of the surge monitoring may be adjusted during conditions where engine air flow disturbances may mask or contribute to surge detection.

At 504, the rate of change of an intake pressure downstream of a compressor as well as a rate of change of a turbine coupled to the compressor are measured. In the engine system of FIG. 1, the rate of change of the intake pressure may include the rate of change of the MAP as measured by MAP sensor 115 and the rate of change of the turbine speed may include a rate of change of turbine speed as measured by turbine speed sensor 162. For the engine system of FIG. 2, the rate of change of the intake pressure may include the rate of change of the MAP as measured by MAP sensor 115. The rate of change of the turbine speed may include a rate of change of a first turbine speed as measured by a first turbine speed sensor 262 and a rate of change of a second turbine speed as measured by a second turbine speed sensor 263. For the engine system of FIG. 3, the rate of change of the intake pressure may include the rate of change of the MAP as measured by MAP sensor 115 and the rate of change of the interstage pressure as measured by pressure sensor 315. The rate of change of the turbine speed may include a rate of change of a first turbine speed as measured by a first turbine speed sensor 362 and a rate of change of a second turbine speed as measured by a second turbine speed sensor 363.

At 506, method 500 determines if the rate of change of the intake pressure is below a first threshold rate of change T1. In one example, the intake pressure may be MAP, and the first threshold rate of change may be −10 psi/sec (−6.9 kPa/sec). However, depending on the configuration of the engine system, other suitable threshold rates of change may be used, such as an intake pressure that is dropping at a rate of 10% or more per second. Further, in engine systems with serial turbochargers, such as the engine system of FIG. 3, more than one intake pressure may monitored. For example, both the MAP and the interstage pressure may be compared to a respective threshold rate of change. In some examples, in order to indicate that the intake pressure rate of change is less than the first threshold rate of change, the rate of change of the intake pressure may be maintained below the threshold rate of change for a given duration, such as 100 ms. If the intake pressure rate of change is not less than the threshold (or if both intake pressure rates of change are not less than respective thresholds), method 500 proceeds to 508 to indicate that no surge is detected, and then method 500 returns.

If the intake pressure rate of change is less than the threshold rate of change, method 500 proceeds to 510 to determine if a turbine speed rate of change is greater than a second threshold rate of change T2. In one example, the second threshold rate of change may be −1000 RPM. In engine systems that include more than one turbocharger, the turbine speed of each turbocharger may be measured and compared to the second threshold rate of change. Further, in such systems, each turbine speed may be associated with a corresponding intake pressure. For example, in parallel configurations, each turbine speed may be associated with MAP, while in series configurations, the upstream, high-pressure turbine speed may be associated with the interstage pressure while the downstream, low-pressure turbine speed may be associated with the MAP such that if only the interstage pressure rate of change is less than the threshold rate of change, only the high-pressure turbine speed will be monitored to determine surge of the low-pressure turbocharger. In some examples, in order to indicate that the turbine speed rate of change is greater than the second threshold rate of change, the rate of change of the turbine speed may be maintained above the threshold rate of change for a given duration, such as 100 ms.

If the turbine speed (associated with the intake pressure that is dropping at the rate identified at 506) is not above the second threshold rate of change, method 500 proceeds to 508 to indicate that no surge is detected and then method 500 returns. In this way, both intake pressure and turbine speed may be changing at respective rates to indicate surge. If the turbine speed (associated with the intake pressure that is dropping at the rate identified at 506) is above the second threshold rate of change, method 500 proceeds to 512 to indicate that a surge event is detected. Method 500 then returns.

Figure 6A:
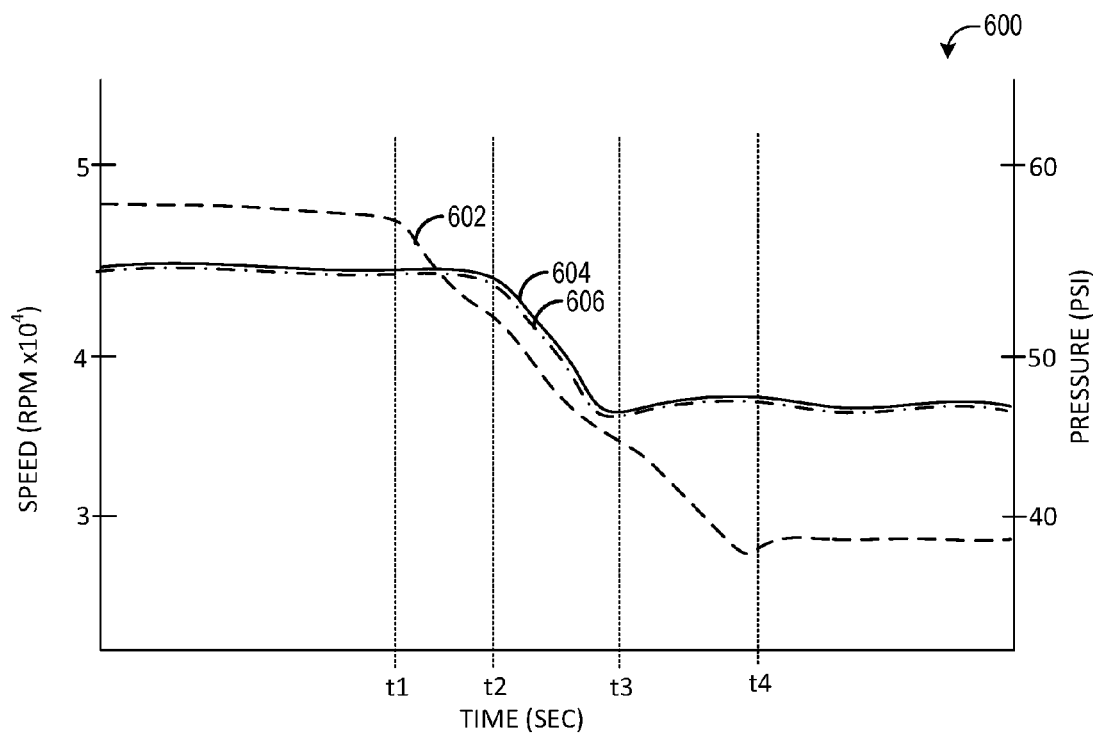
FIGS. 6A, 6B, and 7 are graphs plotting sensed engine operating parameters according to embodiments of the invention.
Figure 6B:
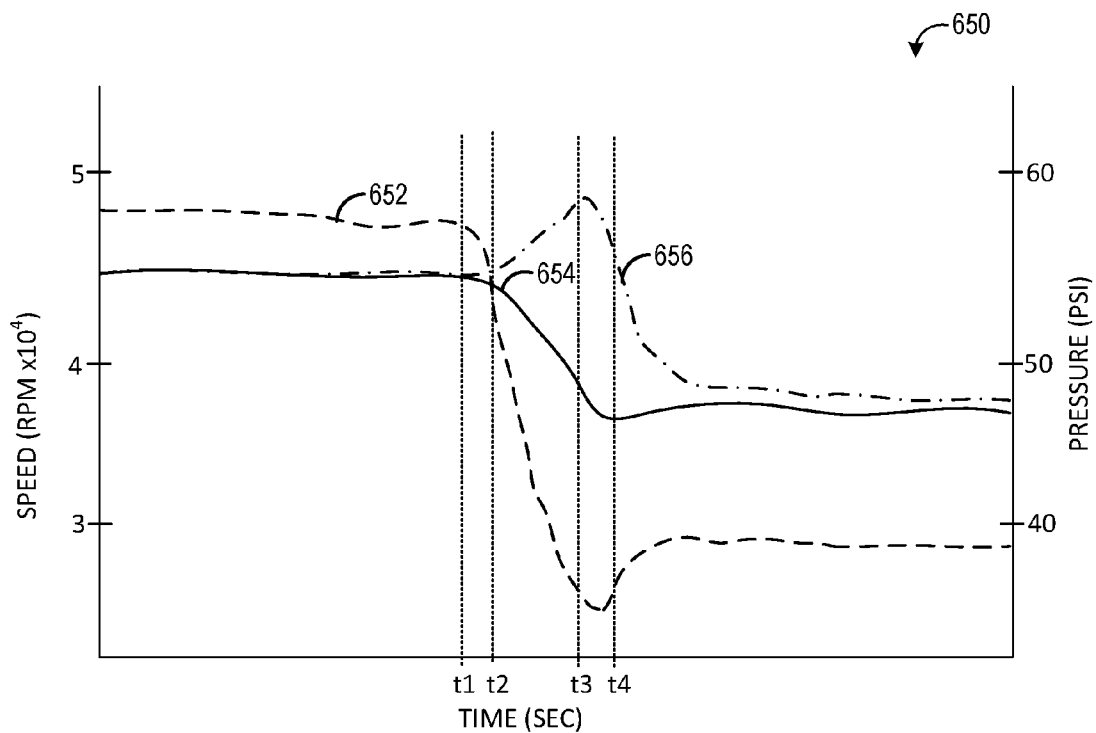
Figure 7:
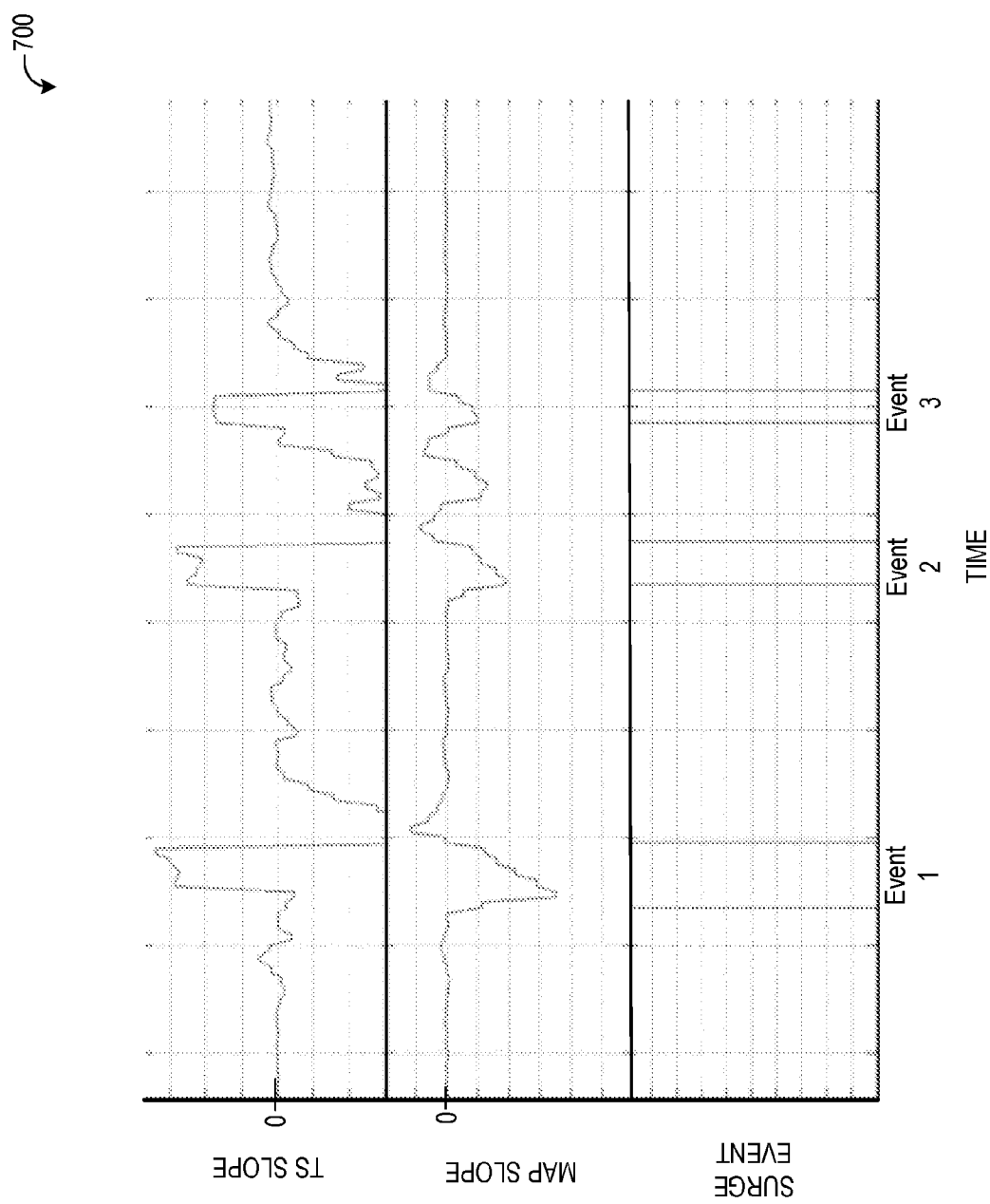

FIGS. 6A, 6B, and 7 illustrate graphs of example operating parameters during surge and non-surge conditions. FIG. 6A shows a graph 600 of turbine speed and MAP as a function of time during a transient engine condition where engine speed and/or load are decreasing, but no surge occurs for an engine having two turbines arranged in parallel (e.g., such as the engine system of FIG. 3). Time is depicted along the horizontal axis, turbine speed is depicted along the left vertical axis, and MAP is depicted along the right vertical axis.

As shown by line 602, prior to time t1, MAP is relatively steady but then starts to decrease at time t1 as a result of the transient condition (e.g., as engine load starts decreasing). A speed of the first turbine, shown by line 604, and a speed of the second turbine, as shown by line 606, each start decreasing at time t2. The turbine speeds stabilize (stop decreasing) at time t3, while the MAP stops decreasing at time t4, due to engine load reaching the commanded engine load (e.g., engine load is no longer changing).

In contrast, FIG. 6B shows a graph 650, similar to graph 600 but where a surge event occurs during the transient event. The transient event begins around time t1, and as such MAP, as shown by line 652 begins to decrease, as does a speed of the first turbine, as shown by line 654. However, the speed of the second turbine increases, as shown by line 656. Further, the MAP decreases more rapidly than the MAP decreased in graph 600. Due to the rate of change of MAP being less than a threshold (e.g., less than −10 psi) as well as the rate of change of the speed of the second turbine being greater than a threshold (e.g., greater than −1000 RPM), a surge event of the second turbocharger is indicated at time t2. At time t3, the surge event is indicated as having ended. The surge event may be indicated as having ended when a threshold amount of time lapses (such as two seconds) or when turbine speed starts decreasing (e.g., a rate of change of the speed of the second turbine is less than a third threshold rate of change, smaller than the second threshold).

FIG. 7 is a graph 700 showing example turbine speed slope (TS slope), MAP slope, and surge event detection over time. As illustrated, a first surge event is detected based on TS slope increasing while MAP decreases at respective threshold rates. Likewise, a second surge event and a third surge event are each detected based on TS slope increasing while MAP decreases at the respective threshold rates. As appreciated by graph 700, each surge event that is detected includes both MAP changing by the threshold rate and turbine speed changing by the threshold rate. In one example, prior to the third surge event, the MAP slope reaches a level where surge may be indicated, but due to turbine speed not increasing by the threshold rate, surge is not indicated. By using both turbine speed and MAP, false positive detections may be avoided.

An embodiment relates to a system. The system includes a turbocharger including a compressor coupled to a turbine and a controller and sensor system. The controller and sensor system is configured to detect a surge event of the turbocharger based on at least one of a rate of change of a pressure measured by sensors downstream of the compressor and a measured rate of change of turbine speed, store operational data associated with the surge event in memory of the controller, and determine a performance of the turbocharger based at least in part on one or more of a cumulative number of detected surge events, a magnitude of detected surge events, or associated operational data.

In an example, the operational data comprises one or more of turbine speed when the surge event is detected or the rate of change of the turbine when the surge event is detected. To determine the performance of the turbocharger, the controller may be configured to categorize each detected surge event based on the turbine speed associated with that surge event and determine the performance responsive to a number of surge events within one or more categories reaching a threshold number. The controller may be configured to output a notification of the performance of the turbocharger. In an example, the performance of the turbocharger comprises a rate of change of performance of the compressor.

In one example, the turbocharger is a first turbocharger including a first compressor coupled to a first turbine. The system further comprises a second turbocharger including a second compressor coupled to a second turbine and arranged in parallel with the first turbocharger. In such an example, the rate of change of the pressure downstream of the first compressor comprises a rate of change of intake manifold pressure.

In another example, the turbocharger is a first turbocharger including a first compressor coupled to a first turbine. The system further includes a second turbocharger including a second compressor coupled to a second turbine and arranged in series with the first turbocharger. In such an example, the rate of change of the pressure downstream of the first compressor comprises a rate of change of an interstage pressure measured between the first compressor and second compressor.

In an example, to detect the surge event based on the rate of change of the pressure downstream of the compressor and the rate of change of turbine speed, the controller is configured to detect the surge event responsive to the rate of change of the pressure being below a first threshold rate of change and the rate of change of the turbine speed exceeding a second threshold rate of change. The performance of the turbocharger may comprise a change in operation of one or more of a compressor bypass valve or wastegate.

Another embodiment relates to a method, including during a transient event where intake pressure is decreasing, detecting a turbocharger surge event based on a rate of change of the decrease in intake pressure and a rate of change of turbocharger turbine speed, storing turbine speed associated with the surge event; classifying the surge event based on the associated turbine speed, and indicating a change in performance of the turbocharger when a number of surge events in one or more classifications reaches a threshold number.

Detecting the turbocharger surge event based on the rate of change of the decrease in intake pressure and the rate of change of turbocharger turbine speed may include detecting the turbocharger surge event only when the rate of change of the decrease in intake pressure is less than a first threshold rate and the rate of change of the turbocharger turbine speed is greater than a second threshold rate. Indicating the change in performance may include outputting a notification of the change in performance to an operator or a remote service.

In examples, classifying the surge event may include assigning the surge event to a first classification defined by a first range of turbine speeds when the associated turbine speed falls in the first range, assigning the surge event to a second classification defined by a second range of turbine speeds when the associated turbine speed falls in the second range, and assigning the surge event to a third classification defined by a third range of turbine speeds when the associated turbine speed falls in the third range. The first range may be greater than the second range and the second range may be greater than the third range.

Indicating the change in performance may include indicating the change in performance responsive to a cumulative number of surge events classified into the first classification reaching a first threshold number; indicating the change in performance responsive to a cumulative number of surge events classified into the second classification reaching a second threshold number; and indicating the change in performance responsive to a cumulative number of surge events classified into the third classification reaching a third threshold number, the third threshold number greater than the second threshold number, the second threshold number greater than the first threshold number.

In examples, indicating the change in performance may include indicating the change in performance responsive to a weighted average of a first cumulative number of surge events classified into the first classification, a second cumulative number of surge events classified into the second classification, and a third cumulative number of surge events classified into the third classification reaching a threshold value.

An embodiment of a system includes a first turbocharger including a first compressor coupled to a first turbine, a second turbocharger including a second compressor coupled to a second turbine, the second turbocharger arranged in parallel with the first turbocharger, and a controller and sensor system. The controller and sensor system is configured to detect a first surge event of the first turbocharger based on a rate of change of intake manifold pressure measured by a sensor and a measured rate of change of turbine speed of the first turbine, detect a second surge event of the second turbocharger based on the rate of change of intake manifold pressure measured by the sensor and a measured rate of change of turbine speed of the second turbine, store first operational data associated with the first surge event and second operational data associated with the second surge event in memory of the controller, indicate a change in performance of the first turbocharger based on a cumulative number of detected first surge events and associated operational data (e.g., operational data associated with the first turbocharger), and indicate a change in performance of the second turbocharger based on a cumulative number of detected second surge events and associated operational data (e.g., operational data associated with the second turbocharger).

In an example, the controller is configured to output a notification of the change in performance of the first turbocharger and output a notification of the change in performance of the second turbocharger. The change in performance of the first turbocharger and the change in performance of the second turbocharger may each comprise a rate of change of performance of a respective wheel of the first compressor and the second compressor.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a turbocharger including a compressor coupled to a turbine; and
   a controller coupled to a plurality of sensors, the controller configured to:
   detect a surge event of the turbocharger based on at least one of a rate of change of a pressure measured by one or more sensors of the plurality of sensors downstream of the compressor and a measured rate of change of turbine speed;
   store operational data associated with the surge event in memory of the controller;
   determine a performance of the turbocharger based at least in part on one or more of a cumulative number of detected surge events, a magnitude of detected surge events, or operational data to generate turbocharger performance data; and
   adjust operation of the turbocharger based on the turbocharger performance data.

2. The system of claim 1, wherein the operational data comprises one or more of turbine speed when the surge event is detected or the measured rate of change of the turbine speed when the surge event is detected.

3. The system of claim 2, wherein to determine the performance of the turbocharger, the controller is configured to categorize each detected surge event into one or more categories based on the turbine speed associated with that surge event and determine the performance responsive to a number of surge events within one or more of the one or more categories reaching a threshold number.

4. The system of claim 1, wherein the controller is configured to output a notification of the performance of the turbocharger.

5. The system of claim 1, wherein the performance of the turbocharger comprises a rate of change of performance of the compressor.

6. The system of claim 1, wherein the turbocharger is a first turbocharger including a first compressor coupled to a first turbine and further comprising a second turbocharger including a second compressor coupled to a second turbine and arranged in parallel with the first turbocharger.

7. The system of claim 6, wherein the rate of change of the pressure downstream of the first compressor comprises a rate of change of intake manifold pressure.

8. The system of claim 1, wherein the turbocharger is a first turbocharger including a first compressor coupled to a first turbine and further comprising a second turbocharger including a second compressor coupled to a second turbine and arranged in series with the first turbocharger.

9. The system of claim 8, wherein the rate of change of the pressure downstream of the first compressor comprises a rate of change of an interstage pressure measured between the first compressor and the second compressor.

10. The system of claim 1, wherein to detect the surge event based on the rate of change of the pressure downstream of the compressor and the rate of change of the turbine speed, the controller is configured to detect the surge event responsive to the rate of change of the pressure being below a first threshold rate of change and the rate of change of the turbine speed exceeding a second threshold rate of change.

11. The system of claim 1, wherein the performance of the turbocharger comprises a change in operation of one or more of a compressor bypass valve or a wastegate.

12. A method, comprising:
    during a transient event where intake pressure of an engine is decreasing, detecting, via one or more sensors and an electronic controller, a turbocharger surge event based on a rate of change of the decrease in intake pressure and a rate of change of turbocharger turbine speed;
    storing, in a memory of the electronic controller, turbine speed associated with the surge event;
    classifying, via the electronic controller, the surge event based on the associated turbine speed;
    indicating, via the electronic controller, a change in performance of the turbocharger when a number of surge events in one or more classifications reaches a threshold number; and
    adjusting, via the electronic controller, one or more operating parameters based on the change in performance of the turbocharger.

13. The method of claim 12, wherein detecting the turbocharger surge event based on the rate of change of the decrease in intake pressure and the rate of change of the turbocharger turbine speed comprises detecting the turbocharger surge event only when the rate of change of the decrease in intake pressure is less than a first threshold rate and the rate of change of the turbocharger turbine speed is greater than a second threshold rate.

14. The method of claim 12, wherein adjusting the one or more operating parameters comprises adjusting a position of a wastegate, adjusting a position of a compressor bypass valve, adjusting fuel injection parameters, or derating the engine, and wherein indicating the change in performance comprises outputting a notification of the change in performance.

15. The method of claim 12, wherein classifying the surge event comprises assigning the surge event to a first classification defined by a first range of turbine speeds when the associated turbine speed falls in the first range, assigning the surge event to a second classification defined by a second range of turbine speeds when the associated turbine speed falls in the second range, and assigning the surge event to a third classification defined by a third range of turbine speeds when the associated turbine speed falls in the third range.

16. The method of claim 15, wherein the first range is greater than the second range and the second range is greater than the third range, and wherein indicating the change in performance comprises:
    indicating the change in performance responsive to a cumulative number of surge events classified into the first classification reaching a first threshold number;
    indicating the change in performance responsive to a cumulative number of surge events classified into the second classification reaching a second threshold number; and
    indicating the change in performance responsive to a cumulative number of surge events classified into the third classification reaching a third threshold number, the third threshold number greater than the second threshold number, the second threshold number greater than the first threshold number.

17. The method of claim 15, wherein indicating the change in performance comprises indicating the change in performance responsive to a weighted average of a first cumulative number of surge events classified into the first classification, a second cumulative number of surge events classified into the second classification, and a third cumulative number of surge events classified into the third classification reaching a threshold value.

* * * * *